Patented July 9, 1929.

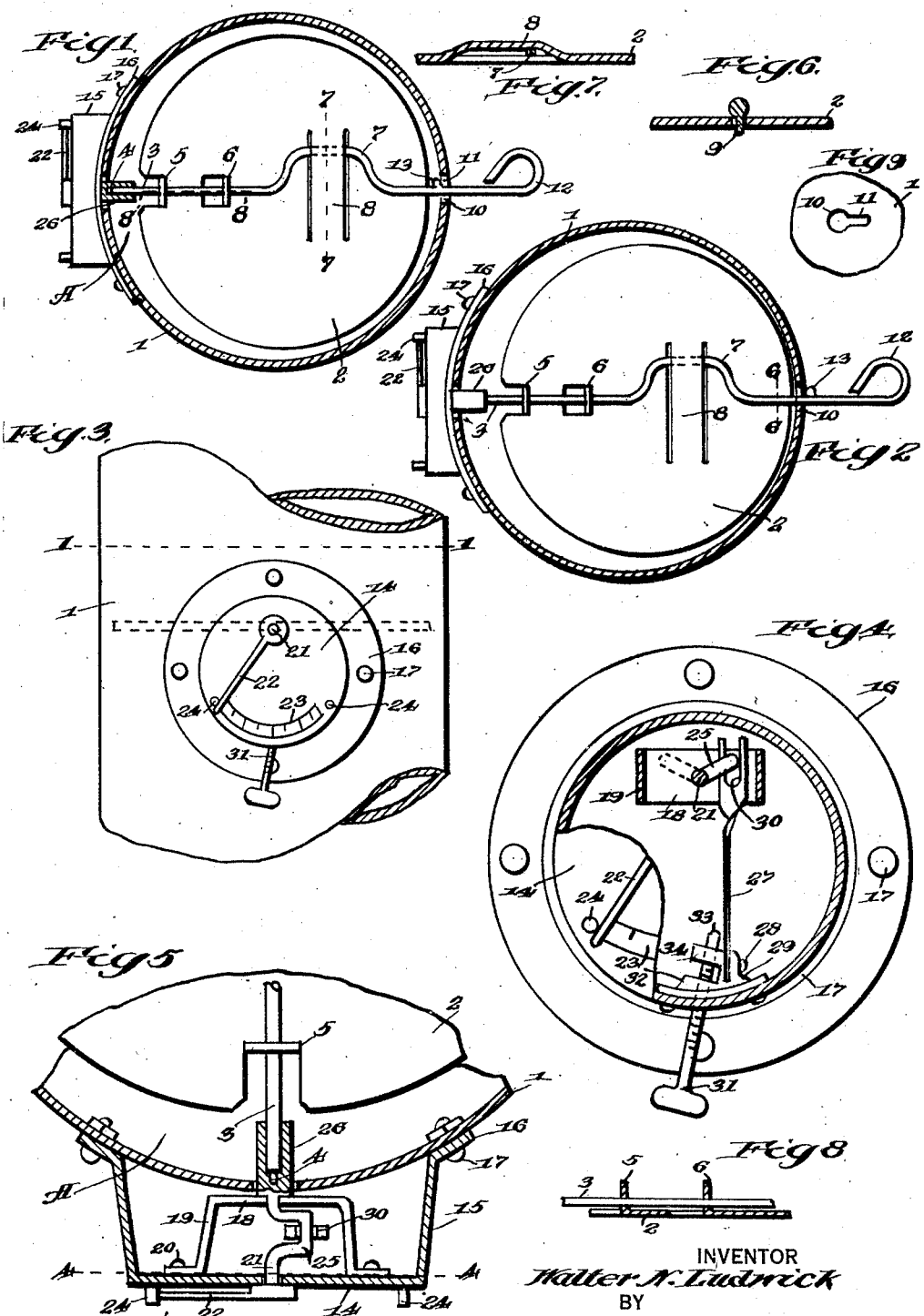

1,720,522

UNITED STATES PATENT OFFICE.

WALTER N. LUDWICK, OF HARRISON, IDAHO.

DAMPER REGULATOR.

Application filed May 14, 1928. Serial No. 277,620.

The object of this invention is to provide novel means for controlling combustion in stoves, furnaces and the like by regulating the draft.

A feature of the invention resides in novel means for controlling combustion by regulating the draft through the usual smoke conducting pipe that leads from the stove or furnace.

A further feature resides in providing thermostatic means subject to the heat in the pipe adjacent the damper, for actuating the latter to regulate combustion.

My invention also includes novel means for operatively connecting the thermostatic means with the damper in such a manner that the latter may be disconnected from said means and operated manually and then returned into operative connection with said means.

A feature of my invention resides in novel means for coaction with the thermostatic element employed for the purpose of rendering the latter more or less resistant to heat flexing action whereby a fire of constantly higher or lower heat may be maintained.

Other features and objects of the invention will be more fully described in connection with the accompanying drawing and will be more particularly pointed out in and by the appended claims.

In the drawing:—

Fig. 1, is a sectional view on line 1—1 of Fig. 3, showing the damper in operative connection with the thermostatic means.

Fig. 2, is a similar view showing the damper disconnected from said means.

Fig. 3, is a view in elevation of a stove-pipe section equipped with the device of my invention and looking toward the thermostatic attachment.

Fig. 4, is an enlarged sectional view on line 4—4 of Fig. 5, showing a portion of the thermostatic device in side elevation.

Fig. 5, is a horizontal sectional view thereof with the major portion of the device in elevation.

Fig. 6, is a detail sectional view on line 6—6 of Fig. 2.

Fig. 7, is a sectional view on line 7—7 of Fig. 1.

Fig. 8, is a sectional view on line 8—8 of Fig. 1.

Fig. 9, is a face view showing a bayonet slot.

Like characters of reference designate similar parts throughout the different figures of the drawing.

As illustrated, I have shown a portion or section of a stove pipe at 1 and it is understood that such section or portion 1 would be in that relation to the stove or furnace approximately equivalent to the point of disposition of the usual damper.

My improved damper is indicated at 2, and the same is of sheet metal form, as regards thickness. However, my improved damper has means, or is located in such a manner that either when closed or partially closed, the flow of products of combustion will be localized more at one portion of the interior of the pipe 1, than at other portions. Thus, as will be seen by reference to Fig. 1, the damper 2, is proportioned so that the greatest clearance or opening is adjacent that interior portion marked A, which portion is nearest the thermostatic device, as will be later described. Thus, the damper is not circular in edge outline but is elongated as regards that axis transverse to its swinging axis.

Reference will next be made to my improved spindle on which my novel damper is mounted.

Said spindle is formed of a small diameter rod of metal having what I will term a clutch end 3, which is cylindrical and which terminates in a polygonal clutch member 4, the function and purpose of which will later appear. The damper 2, is shown provided with upturned journalling portions 5 and 6, through which the spindle extends and the latter is provided with an offset 7, that extends through a doubly slitted portion 8, of the damper 2, as will be clearly seen by reference to Figs. 1 and 7. At the right of Fig. 1, and as shown in Fig. 6, the spindle is provided with a lug 9 that extends through the damper 2 and prevents the latter from shifting endwise of the damper. The portions 5, 6 and 8, hold the damper in fixed relation to said spindle against relative displacement in any other direction, during turning or other movement of the damper.

The spindle extends outwardly through that peripheral portion of the pipe 1, opposite the clutch end 3, and said pipe is provided with a journalling opening 10 (Fig. 9) which is preferably in the form of a bayonet slot form, the elongation extending preferably horizontally, as indicated at 11. The outer end of the spindle may be provided with a looped or crank end 12, whereby the damper may be manually adjusted or turned. Should it be desired to remove the damper from the pipe section, or assemble the damper therein, that portion near lug 9, which is a retaining lug, can be flexed to dislodge lug 9 therefrom, whereupon the spindle may be withdrawn endwise from parts 5, 6 and 8, or endwise inserted thereinto, as will now be clear. The offset portion 7, may easily be withdrawn or inserted through the opening 10.

Reference will next be made to a feature whereby the damper may be shifted in the pipe to connect or disconnect the damper to or from the thermostatic device.

A pipe lug 13 is disposed on the spindle and when the damper is in a certain position, which as shown is a closed position, then lug 13 registers with slot 11, and in this position, the spindle may be withdrawn. When the damper is in any other position, the lug 13 coacts with the interior of the pipe 1 to prevent movement of the spindle and the damper to the right of Fig. 1. In Fig. 1, I have shown the lug 13 in an interior position with the spindle in clutched relation with the thermostatic device, to be later described. If it is desired to shift the spindle out of clutched relation with said device, the lug 13, is registered with slot 11, and the damper and spindle can be shifted to the Fig. 2, position, in which position it can be freely adjusted manually to a closed or open position, independently of the thermostatic device.

Reference will next be made to the thermostatic device and the manner in which the same coacts with the damper.

A casing is shown provided with an outer wall 14 and a peripheral wall 15, the latter having a flange 16, adapted to fit and be riveted or bolted to the pipe 1, as indicated at 17. A bearing bracket, which may be U-shaped, has a bight 18 which is parallel with wall 14, and limbs 19, that are secured to wall 14, as shown at 20. A shaft 21 is journalled in 14 and 18, and on its outer end said shaft carries an index or pointer 22, that is adapted to swing abreast of a graduated portion 23, between stops 24. Thus, the position of the damper can be determined from the exterior of the pipe 1 and the graduated portion will indicate the action of the thermostat.

Said shaft 21, is provided with a crank portion 25, with which the thermostatic element coacts, as will be presently described, and on the inner end of the shaft is suitably fixed what I will term a clutch sleeve or member 26. This member or sleeve 26, as shown, receives the end 3, of the damper spindle and is suitably recessed to clutch with portion 4, so that when the parts are in the position shown in Figs. 1 and 5, the spindle will be non-rotatively connected with sleeve 26. When in the position shown in Fig. 2, the spindle will be disconnected or unclutched from the sleeve 26, but will be journalled in and supported thereby so that the damper cannot fall down in the pipe 1, when it is desired to manually turn the damper.

Reference will next be made to that part of the thermostatic device which is subjected to heat from the pipe 1 and which actuates the damper.

A strip or arm 27, of laminated construction and acting normally to assume the straight position shown in Fig. 4, is suitably anchored at 28, in a fitting 29. When heated, the arm 27 will bend, or its free end will move to the left of Fig. 4. The free end of said arm 27 is shown forked at 30 and this forked or bifurcated portion is in slidable engagement with the crank portion 25, of shaft 21. I have shown in dotted lines the furthest extent of movement of the crank portion 25, under bending stress exerted by the arm 27, which of course would result in a corresponding movement of the damper.

In order to insure a greater extent of controlled combustion I provide means for stiffening arm 27, or in other words, increasing its resistance to bending movement. Thus, I have shown a screw 31, threaded in that portion of fitting designated at 32 and extending to the exterior of the casing so that it will be accessible for adjustment. The upper end 33, moves freely through a guide 34.

Now if the screw 31 is turned so that the arm 27 will not engage the end 33 of the screw, the arm will have no resistance in bending. However, if the screw is adjusted to engage the arm 27, to a greater or lesser extent, then it would require a greater amount of heat to bend the arm, dependent upon the adjustment of the screw.

It will now be clear that if the damper were in the Fig. 1 adjustment, and it was desired to put more fuel into the stove, the damper could readily be shifted into the Fig. 2, position so as to open the damper while the fuel was being put in and thereby prevent the stove from smoking.

It will also be clear that by automatically regulating the draft through the stove or furnace pipe, I can regulate combustion so as to give off an even and uniform heat, thereby saving fuel. A further advantage is that I can prevent a stove or furnace from over-heating, thereby eliminating danger of fire to the dwelling.

It is thought that the invention will be fully understood from the foregoing description and while I have herein shown and described one specific form of my invention, I do not wish to be limited thereto except for such limitations as the claims may import.

I claim:

1. In combination, a stove, furnace or like smoke conducting pipe, a thermostatic device mounted on the exterior of said pipe and having a journalling clutch member extending into said pipe, a damper in said pipe, and a spindle for said damper having a manual end projecting through said pipe and provided with a clutch end adapted to be shifted into and out of clutched relation with said journalling clutch member while in journalled relation therewith.

2. In combination, a stove, furnace or like smoke conducting pipe, a thermostatic device mounted on the exterior of said pipe and having a journalling clutch sleeve extending into said pipe, a damper in said pipe, and a spindle fixed to said damper and having a manual end extending through said pipe and a clutch end adapted to be shifted in said sleeve into and out of clutched relation therewith while in journalled engagement with said sleeve, said spindle having means coacting with said pipe for holding said spindle in clutched relation with said sleeve.

3. In combination, a stove, furnace or like smoke conducting pipe, a thermostatic device therefor having a rotatable clutch sleeve projecting into said pipe, a damper in said pipe, a spindle fixed to said damper and having a crank extending outside said pipe and provided with a clutch end shiftable in said sleeve into and out of clutch relation with said sleeve, said pipe having a bayonet-like opening for the crank of said spindle and the latter having a lug permitting withdrawal of said spindle when said lug is in one given relation with said opening, and said lug coacting with the interior of said pipe in holding said spindle in clutched relation with said sleeve when said lug is out of said given relation with said opening.

4. The combination with a smoke conducting pipe for furnaces or the like having a damper therein, a shaft on which the damper is fixed and whose ends are journaled through bearing openings in the pipe and said shaft having one of its projecting ends cranked, a casing surrounding said end of the shaft and secured to the pipe, and through which the outer and straight end of the said end of the shaft passes, a laminated thermostatic arm having one end fixed in the casing and its second end forked to receive the crank of the shaft therein, a hand fixed on the outer end of the shaft and disposed over the outer face of the casing, and spaced stop elements on the casing in the path of contact with the hand, all as and for the purpose set forth.

In witness whereof, I have hereunto affixed my signature.

WALTER N. LUDWICK.